United States Patent
Miyata

(10) Patent No.: US 8,032,464 B2
(45) Date of Patent: Oct. 4, 2011

(54) SERVER PRINTING APPARATUS AND ITS CONTROL METHOD, AND COMPUTER PROGRAM

(75) Inventor: Junichi Miyata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1026 days.

(21) Appl. No.: 11/214,754

(22) Filed: Aug. 31, 2005

(65) Prior Publication Data

US 2006/0044610 A1 Mar. 2, 2006

(30) Foreign Application Priority Data

Aug. 31, 2004 (JP) ................. 2004-252904

(51) Int. Cl.
*G06F 3/033* (2006.01)
*H04N 1/00* (2006.01)
(52) U.S. Cl. ............. 705/64; 713/193; 713/176
(58) Field of Classification Search .......... 705/64; 713/193
See application file for complete search history.

(56) References Cited

U.S. PATENT DOCUMENTS

| | | | | |
|---|---|---|---|---|
| 4,864,618 A * | 9/1989 | Wright et al. | ........... | 380/51 |
| 5,051,736 A * | 9/1991 | Bennett et al. | ........... | 345/180 |
| 5,477,012 A * | 12/1995 | Sekendur | ........... | 178/18.09 |
| 5,509,074 A * | 4/1996 | Choudhury et al. | ........... | 713/176 |
| 5,539,824 A * | 7/1996 | Bjorklund et al. | ........... | 380/249 |
| 5,661,506 A * | 8/1997 | Lazzouni et al. | ........... | 345/179 |
| 5,661,806 A * | 8/1997 | Nevoux et al. | ........... | 380/247 |
| 5,692,073 A * | 11/1997 | Cass | ........... | 382/219 |
| 5,745,576 A * | 4/1998 | Abraham et al. | ........... | 705/73 |
| 5,771,291 A * | 6/1998 | Newton et al. | ........... | 713/185 |
| 5,852,434 A * | 12/1998 | Sekendur | ........... | 345/179 |
| 5,970,147 A * | 10/1999 | Davis | ........... | 713/172 |
| 6,076,734 A * | 6/2000 | Dougherty et al. | ........... | 235/462.01 |
| 6,289,382 B1 * | 9/2001 | Bowman-Amuah | ........... | 709/226 |
| 6,314,521 B1 * | 11/2001 | Debry | ........... | 726/10 |
| 6,378,070 B1 * | 4/2002 | Chan et al. | ........... | 713/155 |
| 6,385,728 B1 * | 5/2002 | DeBry | ........... | 726/9 |
| 6,519,571 B1 * | 2/2003 | Guheen et al. | ........... | 705/14.66 |
| 6,567,530 B1 * | 5/2003 | Keronen et al. | ........... | 382/100 |
| 6,628,413 B1 * | 9/2003 | Lee | ........... | 358/1.15 |
| 6,654,883 B1 * | 11/2003 | Tatebayashi | ........... | 713/168 |
| 6,964,374 B1 * | 11/2005 | Djuknic et al. | ........... | 235/462.01 |
| 6,977,745 B2 * | 12/2005 | Sharma | ........... | 358/1.15 |
| 6,985,953 B1 * | 1/2006 | Sandhu et al. | ........... | 709/229 |
| 7,003,667 B1 * | 2/2006 | Slick et al. | ........... | 713/182 |
| 7,075,672 B2 * | 7/2006 | Onishi et al. | ........... | 358/1.15 |
| 2002/0178354 A1 * | 11/2002 | Ogg et al. | ........... | 713/155 |
| 2005/0066188 A1 * | 3/2005 | Lapstun et al. | ........... | 713/193 |

FOREIGN PATENT DOCUMENTS

JP 2004-153472 5/2004

* cited by examiner

*Primary Examiner* — Evens J Augustin
(74) *Attorney, Agent, or Firm* — Fitzpatrick, Cella, Harper & Scinto

(57) ABSTRACT

A server printing apparatus which can communicate with a plurality of processors for respectively executing any of not less than one processes included in a print-related process according to a print order, includes a storage unit for storing execution content information indicating execution contents using at least one processor in association with the print-related process according to the print order, an encryption key storage unit for storing encryption keys uniquely and respectively given to the plurality of processors, and an encryption processing unit for encrypting information associated with each of the processors in the execution content information using the encryption key unique to that processor, and the processors are controlled to execute the print-related process according to the print order using the execution content information.

8 Claims, 22 Drawing Sheets

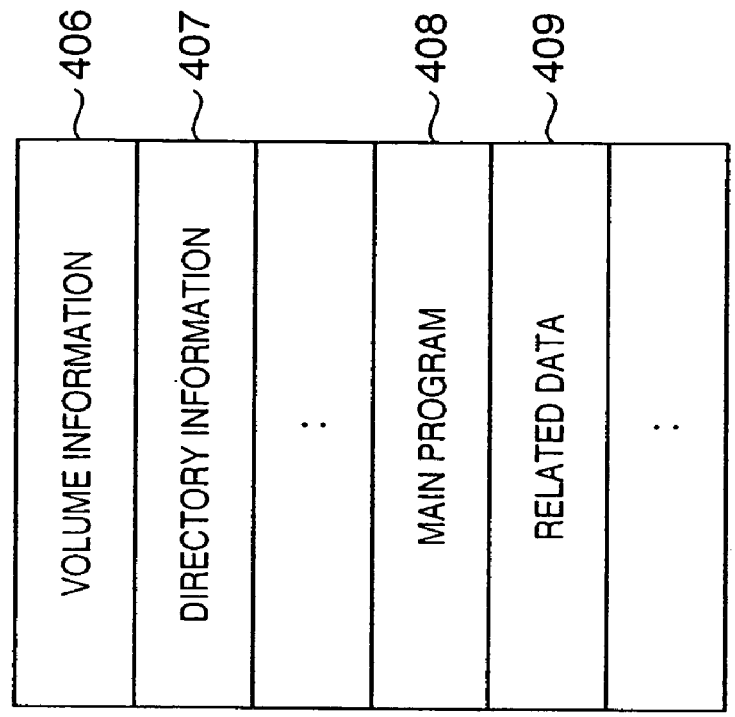
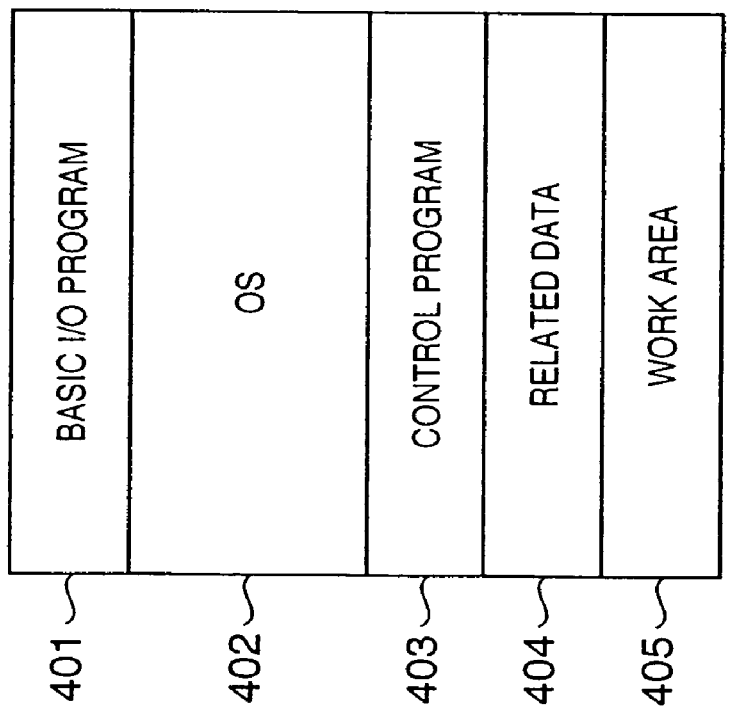

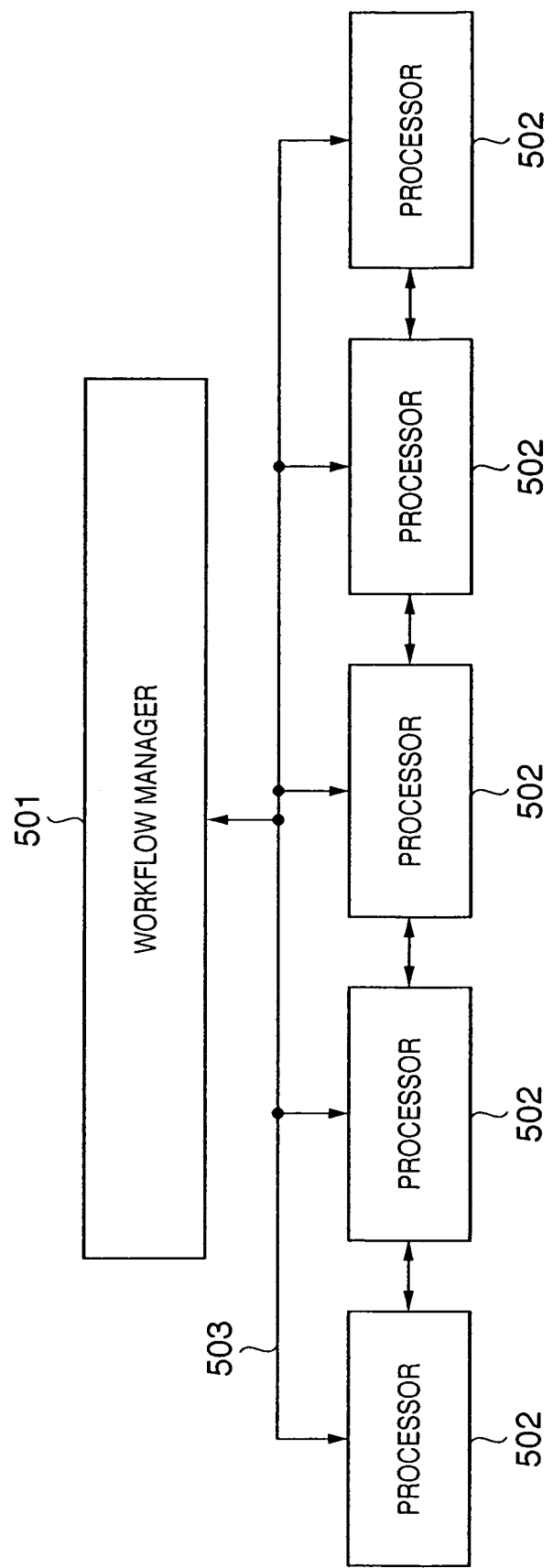

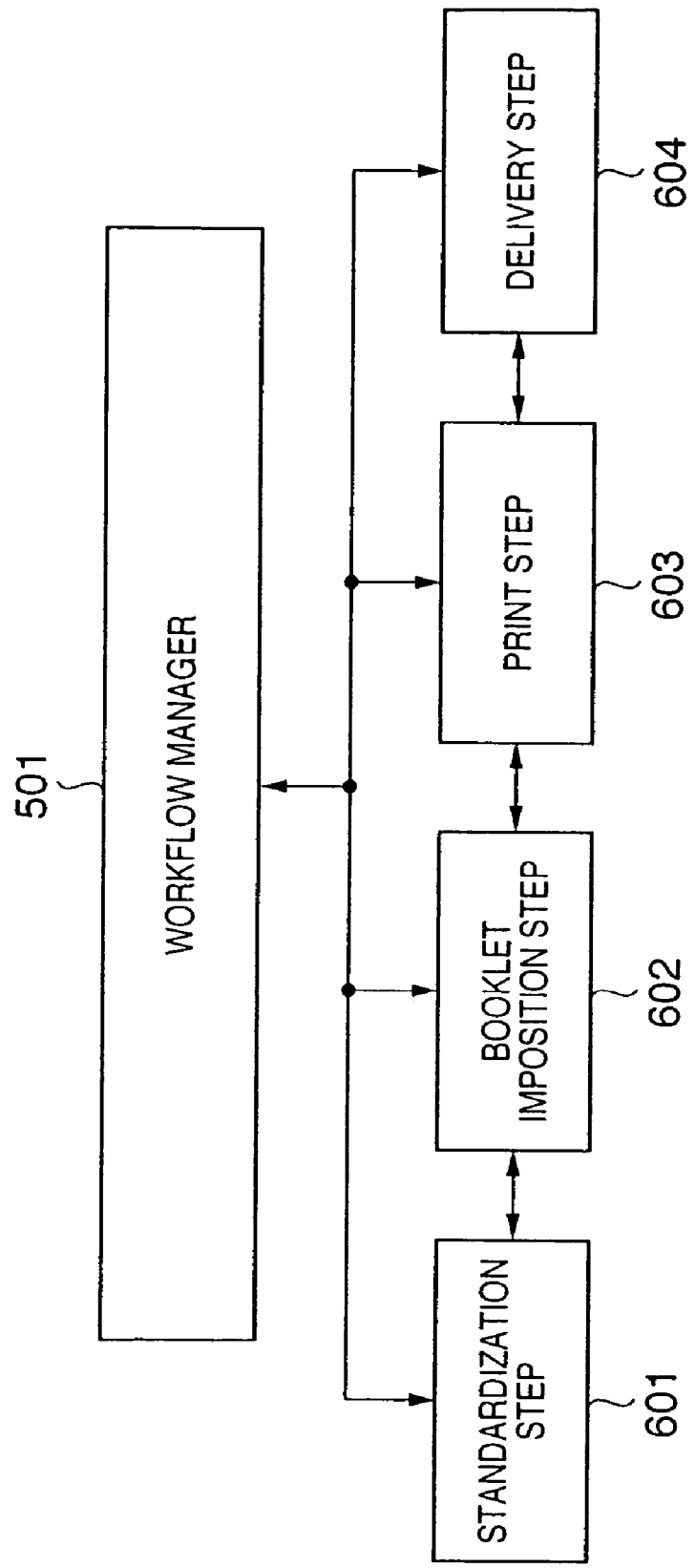

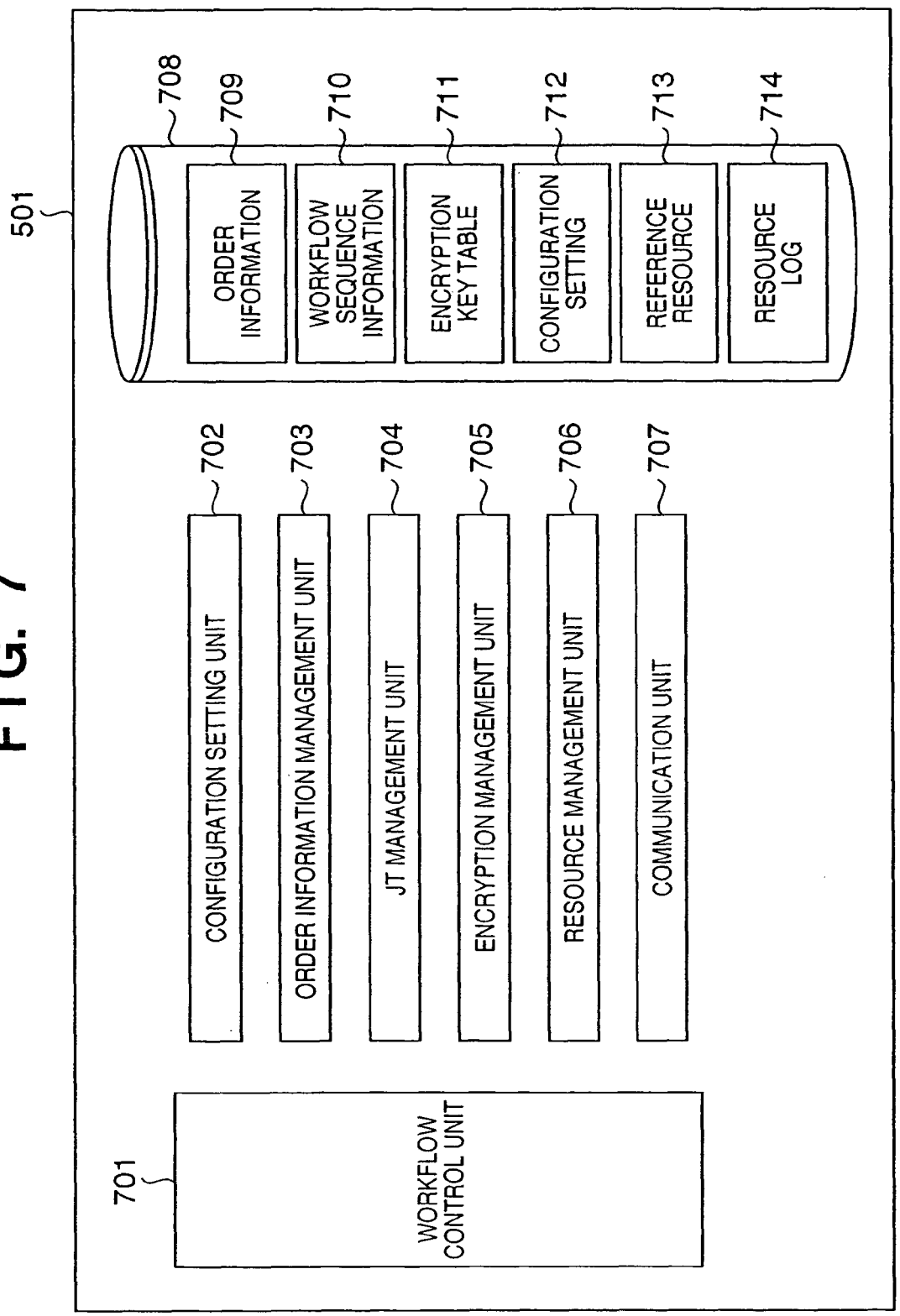

FIG. 9

| | ITEM | | MEANING (SETTING VALUE) |
|---|---|---|---|
| 901 — ORDER GENERAL INFORMATION | SERVICE TYPE | | OUTPUT/BOOKBINDING SERVICE |
| | | | POSTER/PANEL |
| | | | COPY SERVICE |
| | | | REORDER |
| | DELIVERY DESTINATION INFORMATION | | USER NAME/DELIVER DESTINATION ADDRESS |
| | ORDER ID | | UNIQUE ID |
| 902 — DOCUMENT INFORMATION | NUMBER OF PAGES | | NUMERICAL VALUE |
| | DOCUMENT DATA NAME | | URI USED TO IDENTIFY FILE |
| | FINISHED SIZE | | B0,A0,B1··· |
| 903 — PRINT STYLE | ORIENTATION OF OUTPUT SHEET | | PORTRAIT |
| | | | LANDSCAPE |
| | PRINT METHOD | | ONE-SIDED PRINTING |
| | | | TWO-SIDED PRINTING |
| | COLOR MODE | | COLOR |
| | | | GRAY |

| JOB ID |
| WORK LOG |

For Processor A:
- PROCESSOR A IDENTIFIER
- ENCRYPTION SETTING ON/OFF
- ENCRYPTION INFORMATION
- PROCESSOR A SETTING PARAMETER
- PROCESSOR A INPUT RESOURCE
- PROCESSOR A OUTPUT RESOURCE For Processor B:
- PROCESSOR B IDENTIFIER
- ENCRYPTION SETTING ON/OFF
- ENCRYPTION INFORMATION
- PROCESSOR B SETTING PARAMETER
- PROCESSOR B INPUT RESOURCE
- PROCESSOR B OUTPUT RESOURCE For Processor C:
- PROCESSOR C IDENTIFIER
- ENCRYPTION SETTING ON/OFF
- ENCRYPTION INFORMATION
- PROCESSOR C SETTING PARAMETER
- PROCESSOR C INPUT RESOURCE
- PROCESSOR C OUTPUT RESOURCE For Processor D:
- PROCESSOR D IDENTIFIER
- ENCRYPTION SETTING ON/OFF
- ENCRYPTION INFORMATION
- PROCESSOR D SETTING PARAMETER
- PROCESSOR D INPUT RESOURCE
- PROCESSOR D OUTPUT RESOURCE

COMMON TRAILER

FIG. 11A

| PROCESSOR ID | PRIVATE KEY OF SERVER | PUBLIC KEY OF PROCESSOR |
|---|---|---|
| 0 | PRIVATE KEY 0 | PUBLIC KEY 0' |
| 1 | | |
| 2 | | |
| 3 | | |

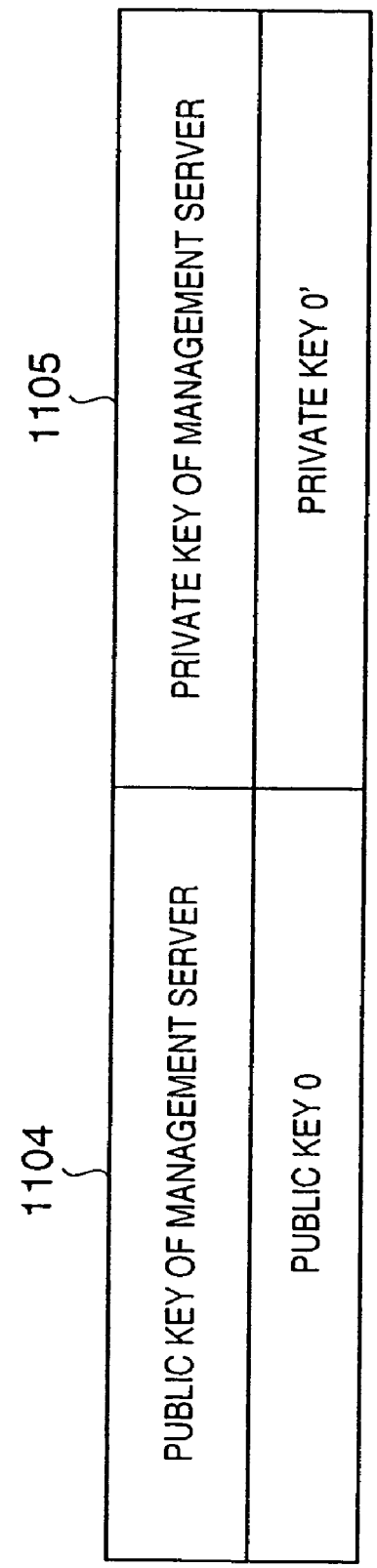

F I G. 11C

| PROCESSOR ID | PRIVATE KEY OF SERVER | PUBLIC KEY OF PROCESSOR |
|---|---|---|
| 0 (STANDARDIZATION) | PRIVATE KEY 0 | PUBLIC KEY 0 |
| 1 (BOOKLET IMPOSITION) | PRIVATE KEY 1 | PUBLIC KEY 1 |
| 2 (PRINT) | PRIVATE KEY 2 | PUBLIC KEY 2 |
| 3 (DELIVERY) | PRIVATE KEY 3 | PUBLIC KEY 3 |

| SETTING ITEM | SETTING VALUE |
|---|---|
| | |
| | |
| | |
| | |

FIG. 12B

| SETTING ITEM | SETTING VALUE |
|---|---|
| SECURE MODE | ON |
| DELETION CERTIFICATE | ON |
| | |
| | |

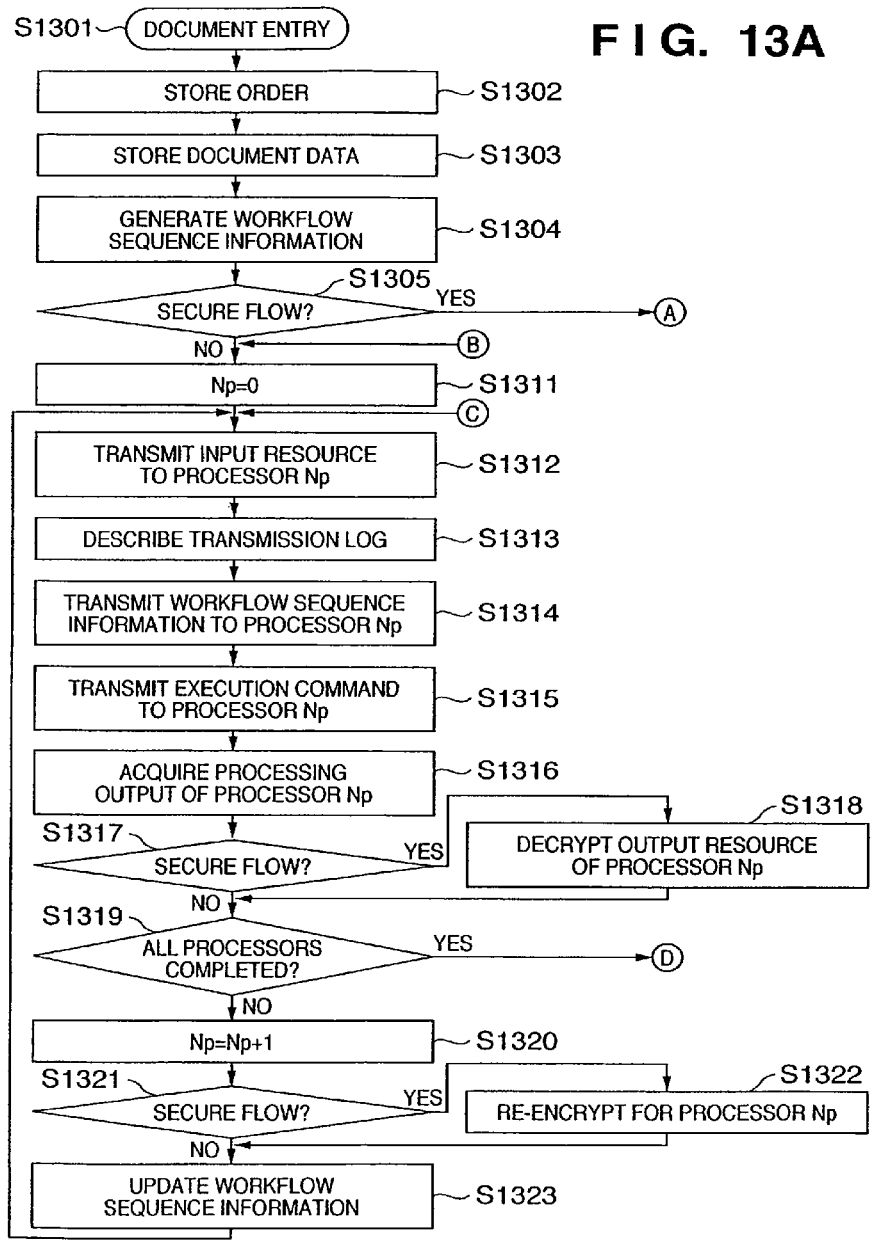

F I G. 15

| | |
|---|---|
| 13:30 | TRANSMIT ENTRY.TXT TO STANDARDIZATION PROCESSOR |
| 13:31 | TRANSMIT STANDARDIZED_DATA.IWD TO BOOKLET IMPOSITION PROCESSOR |
| 13:32 | TRANSMIT IMPOSED_DATA.IWD TO PRINT PROCESSOR |
| 13:33 | DELETE ENTRY.TXT BY STANDARDIZATION PROCESSOR |
| 13:34 | DELETE STANDARDIZED_DATA.IWD BY BOOKLET IMPOSITION PROCESSOR |
| 13:35 | DELETE IMPOSED_DATA.IWD BY PRINT PROCESSOR |

FIG. 16

| | ITEM | MEANING (SETTING VALUE) |
|---|---|---|
| 1601 — ORDER GENERAL INFORMATION | SERVICE TYPE | OUTPUT SERVICE |
| | DELIVERY DESTINATION INFORMATION | TARO YAMADA/12-34 DD, OO CITY |
| | ORDER ID | ID1234567 |
| 1602 — DOCUMENT INFORMATION | NUMBER OF PAGES | 8 |
| | DOCUMENT DATA NAME | ENTRY.txt |
| | FINISHED SIZE | A4 |
| 1603 — PRINT STYLE | PRINT METHOD | TWO-SIDED PRINTING |
| | COLOR MODE | COLOR |

FIG. 17A

| | |
|---|---|
| ID1234567 | 1701 |
| 0 : STANDARDIZATION PROCESSOR | 1702 |
| ENCRYPTION SETTING : OFF | 1703 |
| NULL | 1704 |
| NULL | 1705 |
| ENTRY.TXT | 1706 |
| STANDARDIZED_DATA.iwd | 1707 |
| 1 : BOOKLET IMPOSITION PROCESSOR | 1708 |
| ENCRYPTION SETTING : OFF | 1709 |
| NULL | 1710 |
| 4 PAGES | 1711 |
| STANDARDIZED_DATA.iwd | 1712 |
| IMPOSED_DATA.iwd | 1713 |
| 2 : PRINT PROCESSOR | 1714 |
| ENCRYPTION SETTING : OFF | 1715 |
| NULL | 1716 |
| COLOR/TWO-SIDED | 1717 |
| IMPOSED_DATA.iwd | 1718 |
| PRINTER A ; TRAY 1 | 1719 |
| 3 : DELIVERY PROCESSOR | 1720 |
| ENCRYPTION SETTING : OFF | 1721 |
| NULL | 1722 |
| NULL | 1723 |
| PRINTER A ; TRAY 1 | 1724 |
| NAME: TARO YAMADA<br>DELIVERY ADDRESS: 12-34 DD, OO CITY | 1725 |
| COMMON TRAILER | 1726 |

FIG. 17B

| |
|---|
| ID1234567 |
| 0 : STANDARDIZATION PROCESSOR |
| ENCRYPTION SETTING : ON |
| ENCRYPTION INFORMATION |
| ????????????????????????????????????? |
| ????????????????????????????????????? |
| ????????????????????????????????????? |
| 1 : BOOKLET IMPOSITION PROCESSOR |
| ENCRYPTION SETTING : ON |
| ENCRYPTION INFORMATION |
| XXXXXXXXXXXXXXXXXXXXXXXXXXXXXX |
| XXXXXXXXXXXXXXXXXXXXXXXXXXXXXX |
| XXXXXXXXXXXXXXXXXXXXXXXXXXXXXX |
| 2 : PRINT PROCESSOR |
| ENCRYPTION SETTING : ON |
| ENCRYPTION INFORMATION |
| YYYYYYYYYYYYYYYYYYYYYYYYYYYYYYY |
| YYYYYYYYYYYYYYYYYYYYYYYYYYYYYYY |
| YYYYYYYYYYYYYYYYYYYYYYYYYYYYYYY |
| 3 : DELIVERY PROCESSOR |
| ENCRYPTION SETTING : ON |
| ENCRYPTION INFORMATION |
| !!!!!!!!!!!!!!!!!!!!!!!!!!!!!!!!!!!!!!!!!!!!!!!!!!!!!!! |
| !!!!!!!!!!!!!!!!!!!!!!!!!!!!!!!!!!!!!!!!!!!!!!!!!!!!!!! |
| !!!!!!!!!!!!!!!!!!!!!!!!!!!!!!!!!!!!!!!!!!!!!!!!!!!!!!! |
| COMMON TRAILER |

- 1729 (standardization encryption block)
- 1730 (booklet imposition encryption block)
- 1731 (print encryption block)
- 1732 (delivery encryption block)

SERVER PRINTING APPARATUS AND ITS CONTROL METHOD, AND COMPUTER PROGRAM

FIELD OF THE INVENTION

The present invention relates to a server printing apparatus for executing a print process and its control method, and a computer program.

BACKGROUND OF THE INVENTION

Conventionally, commercial printing agents who generate prints in accordance with requests from customers such as individual users, corporations, and the like exist. Such printing agent provides a service for generating prints on the basis of print data (original) and orders including a print style, the number of copies, due date, and the like from the customer, and making a delivery to the customer. Such printing agent provides the service using a large-scale apparatus such as a long-established offset reproduction printing press or the like.

Nowadays, with the advent of high-speed and high-image quality electrophotographic and ink-jet printing apparatuses, a business category of commercial printing called "copy service", "printing service", "Print On Demand (POD) center", or the like is present. A print request is made to such printing agent in such a manner that the user mails or directly brings a document recorded on paper sheets or in a digital or optical recording medium (FD, MO, CD-ROM, DVD-ROM, or the like) and a print order sheet that describes the number of copies to be printed, bookbinding method, due date, and the like of that document into the printing company who provides the service. In this specification, the request based on a document and print order sheet is called a document entry.

Also, a system that can issue/receive print orders on-line via the Internet or intranet has been in practical use. For example, in "DotDoc.Web" available from Fuji Xerox Co., Ltd., the user accesses a home page provided by the printing agent from the self terminal, fills in required items such as orderer information (receiving address or the like), print style, the number of copies, and the like of a print request form, and submits the print request form together with a document file, thus placing the print order of that document. In response to this order, the printing agent side generates data corresponding to the aforementioned print order sheet on the basis of the request contents from the user, and forms a schedule of the print process. Print and bookbinding processes are executed by a printer connected to a work computer, and generated prints are delivered to the customer in accordance with the schedule, thus ending the service.

The printing agent which executes the print process requested by the user must complete the print process with stable quality in time for the designated due date. Also, in a large-scale printing center, a plurality of operators must parallelly process many print requests (orders) using a large variety of printing apparatuses and work computers. In such system, a technique that allows to access the contents of a print request (copy request) by operating each work computer is available.

However, in the conventional system, for example, when the right of access to the workflow is to be given in only a specific work step of the work schedule that processes the print order, or when a given work step is done at a remote site that cannot be managed, the access right cannot be controlled. That is, under the existing circumstances it is difficult to make a secure setting that obscures a part specialized to a given work step from other work steps in the work schedule.

It is, therefore, an object of the present invention to protect the security of information required in a given work step against other work steps.

SUMMARY OF THE INVENTION

In order to solve the aforementioned problems, the present invention comprises the following arrangement.

A server printing apparatus which can communicate with a plurality of processors for respectively executing any of not less than one processes included in a print-related process according to a print order, comprises a storage unit for storing execution content information indicating execution contents using at least one processor in association with the print-related process according to the print order, an encryption key storage unit for storing encryption keys uniquely and respectively given to the plurality of processors, and an encryption processing unit for encrypting information associated with each of the processors in the execution content information using the encryption key unique to that processor, and the processors are controlled to execute the print-related process according to the print order using the execution content information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A and 4B respectively show an example of a memory map and the media configuration according to the embodiment of the present invention;

FIG. 5 is a block diagram showing an example of the software configuration of a printing site 103 according to the embodiment of the present invention;

FIG. 6 is a block diagram showing a practical example of the software configuration of the printing site 103 according to the embodiment of the present invention;

FIG. 7 is a block diagram showing the detailed configuration of a workflow manager 501 according to the embodiment of the present invention;

FIG. 9 shows an example of the configuration of order information according to the embodiment of the present invention;

FIGS. 10A to 10C are views showing an example of the configuration of workflow sequence information according to the embodiment of the present invention;

FIGS. 11A to 11C are views showing an example of the configuration of an encryption key table according to the embodiment of the present invention;

FIGS. 12A and 12B are views showing an example of a configuration setting 712 of the workflow manager 501 according to the embodiment of the present invention;

FIGS. 13A and 13B are flowcharts showing an example of the processing of the workflow manager 501 according to the embodiment of the present invention;

FIG. 15 shows an example of deletion certificate information according to the embodiment of the present invention;

FIG. 16 shows a practical example of order information according to the second embodiment of the present invention; and FIGS. 17A and 17B show a practical example of workflow sequence information according to the second embodiment of the present invention.

DETAILED DESCRIPTION OF THE PREFERRED EMBODIMENTS

Preferred embodiments of the present invention will now be described in detail in accordance with the accompanying drawings.

First Embodiment

Figure 1:
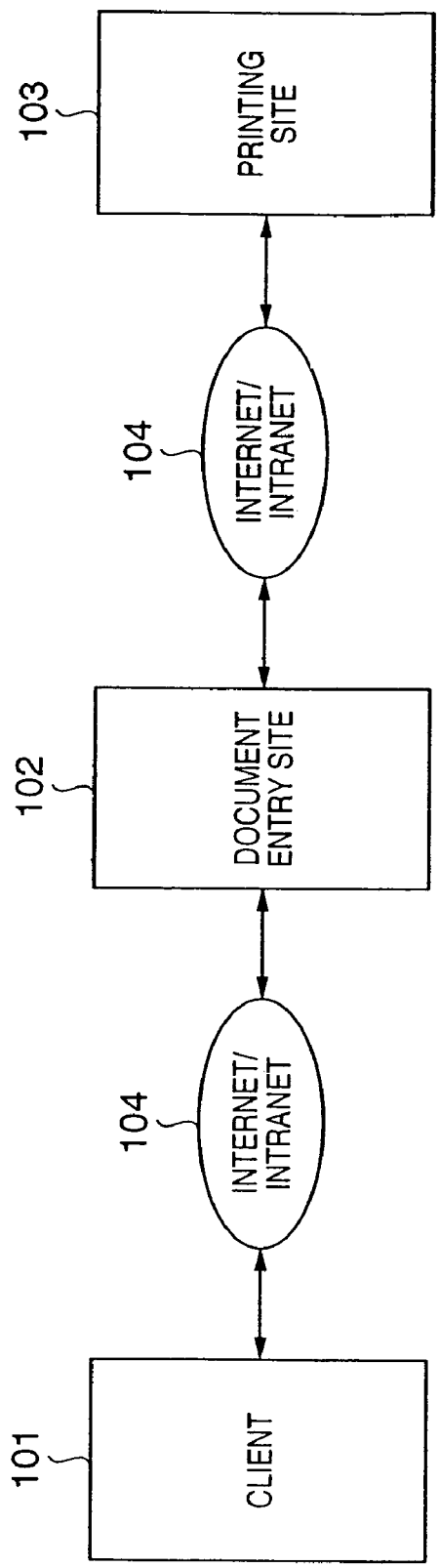
FIG. 1 is a diagram showing an example of the arrangement of a printing system according to an embodiment of the present invention.

FIG. 1 shows the overall arrangement of a printing system according to the embodiment of the present invention. Note that the environment of the entire printing system in the following description is exemplified for the sake of easy understanding of the description of the present invention, and the present invention is not limited to such specific environment.

Referring to FIG. 1, a client 101 is a personal computer which is used by the user to issue a print request of a predetermined document using the printing system of the present invention and is connected via a network such as the Internet or the like. A document entry site 102 is a server apparatus which includes a WEB server or the like which provides document entry contents required to receive the print request from the user via the client 101. The document entry site 102 comprises a database or the like, which stores the contents of a print order which is input by the user from the client 101 and is transmitted to the document entry site 102, and stores a digitally entered document.

A printing site 103 serves as a server printing apparatus which carries out the print order by executing an actual print process, a delivery process to the user, and the like on the basis of the print request from the user. The client 101, document entry site 102, and printing site 103 are interconnected via a network 104 such as the Internet or intranet.

Figure 2:
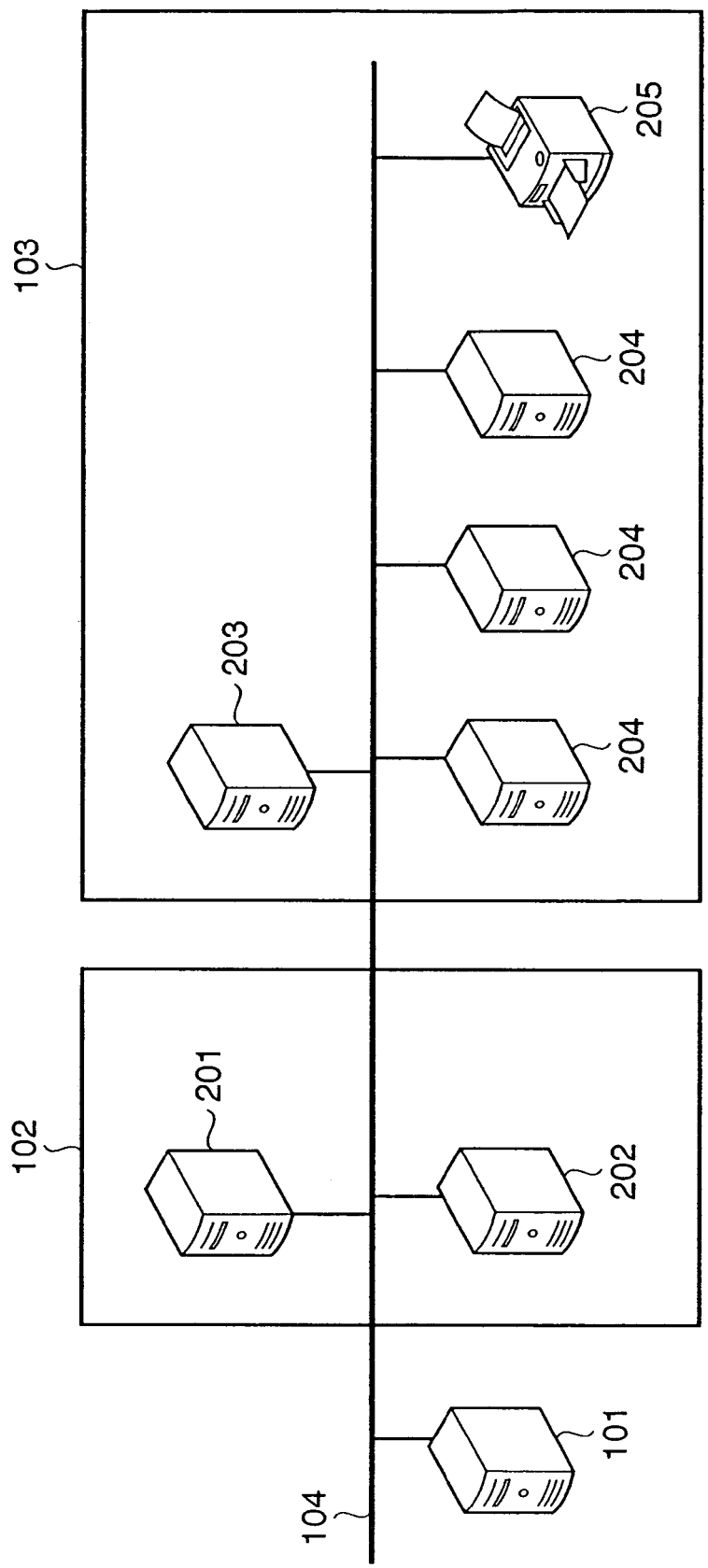
FIG. 2 is a diagram showing the detailed arrangement of the printing system shown in FIG. 1.

FIG. 2 shows details of the respective components in FIG. 1. Referring to FIG. 2, the document entry site 102 includes a WEB server 201 which provides document entry contents (i.e., a Web page for document entry) used to enter a document to the user via the client 101, and a database (DB) server 202 which manages an order ticket that indicates the contents of a print order and an original document of the order, which are entered from the client 101.

The printing site 103 includes a workflow management server 203 (to be described later) which periodically collects order information stored in the DB server 202 and is required to operate the printing system itself of the present invention, processors (i.e., processing devices) 204 which perform processes of respective print steps required to carry out the order, a printer 205 as a processor for executing the print process itself, and the like.

The printer 205 has different installed arrangements such as a monochrome printer, color printer, and the like depending on printing centers. In general, a combination of a high-speed monochrome printer and a high-quality color printer is preferable.

The work processor that executes the processes of the respective print steps may also serve as an offline bookbinder, stapler, puncher, case binder, ring binder, and the like so as to bind paper sheets output from the printer 205.

Since these processors 204 and printer 205 are connected to the network, the workflow management server 203 can collect their status information. Upon reception of an order fixed message from the WEB server 201 based on a print order formally placed by the user, the workflow management server 203 acquires order information and a document data file from the DB server 202, and controls the printing system in accordance with the acquired order information and a workflow to be described later.

Figure 3:
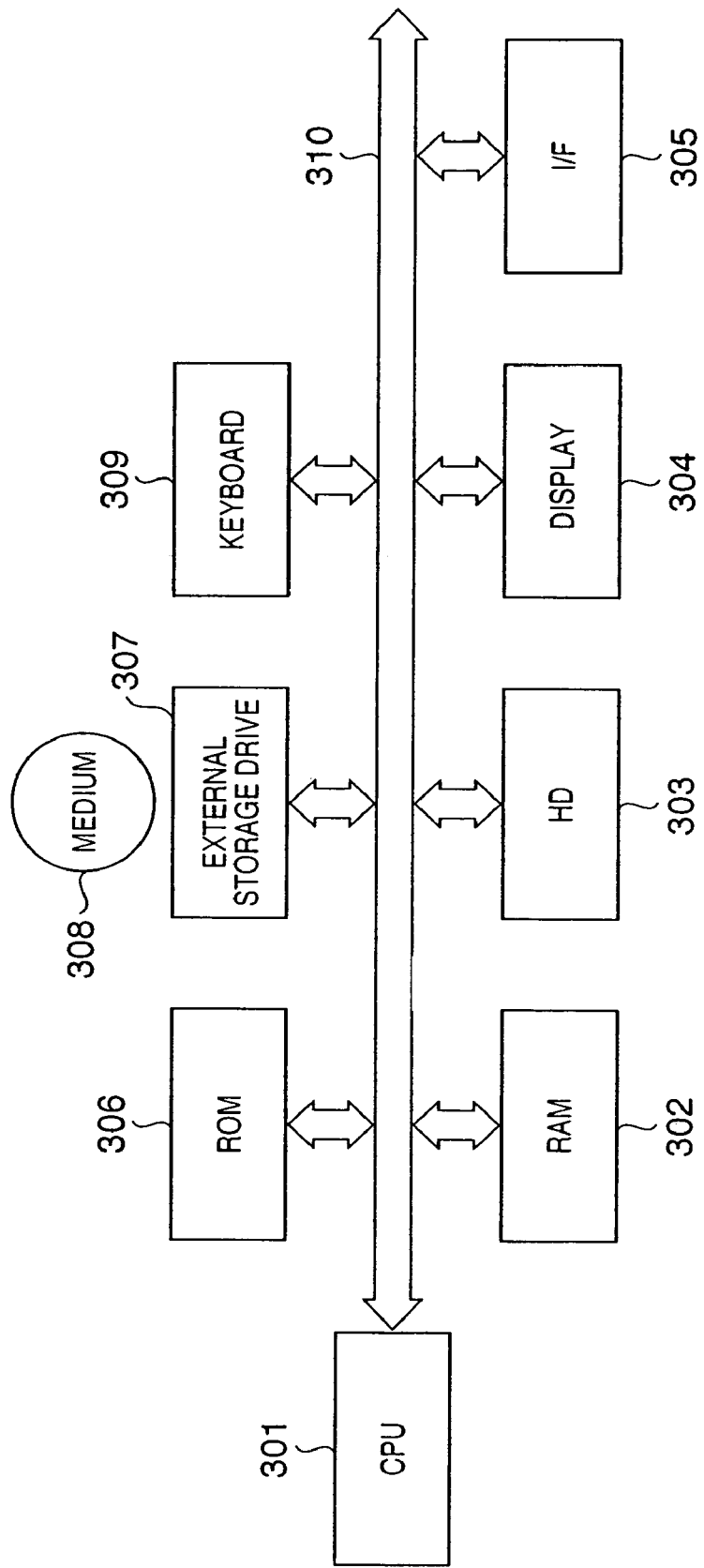
FIG. 3 is a block diagram showing an example of the hardware arrangement of an information processing apparatus according to the embodiment of the present invention.

FIG. 3 is a schematic block diagram showing the arrangement of an information processing apparatus which serves as the client 101, WEB server 201, DB server 202, workflow management server 203, and processors 204.

A CPU 301 executes an application program, printer driver program, OS, network printer control program, and the like stored in an HD (hard disk) 303, and controls to temporarily store information, files, and the like required to execute such programs in a RAM 302. A ROM 306 stores programs such as a basic I/O program and the like, and various data such as font data and the like used in a document process. Reference numeral 302 denotes a RAM which serves as a main memory, work area, and the like of the CPU 301. Reference numeral 307 denotes an external storage drive which can load programs and the like stored in a medium 308 to this computer system.

Reference numeral 308 denotes a medium as a storage medium, which stores programs and related data described in this embodiment. FIG. 4B shows the contents stored in the medium 308. Reference numeral 303 denotes an HD which stores an application program, printer driver program, OS, control program, related program, and the like. Reference numeral 309 denotes a keyboard which serves as a user interface used by the operator of the information processing apparatus to input commands such as a device control command and the like. Reference numeral 304 denotes a display which displays commands input from the keyboard 309, printer status, and the like.

Reference numeral 310 denotes a system bus which controls the data flow in the computer. Reference numeral 305 denotes a network interface (to be abbreviated as I/F hereinafter), which is a communication I/F required to connect this apparatus to a local area network (LAN) or the Internet.

FIG. 4A shows a memory map when programs for the processing according to this embodiment are loaded onto the RAM 302 and are ready to be executed. In the example of this embodiment, programs and related data are directly loaded from the medium 308 onto the RAM 302 and are executed. In addition, every time the program of the present invention is launched from the medium 308, programs and related data may be loaded from the HD 303 onto the RAM 302.

The medium that records the program of the present invention may be an FD, CD-ROM, DVD, IC memory card, or the like. Furthermore, the program of the present invention may be recorded in the ROM 306 to form one field of the memory map, and may be directly executed by the CPU 301.

Reference numeral 401 denotes a field which stores a basic I/O program, i.e., a program having an IPL (initial program loading) function or the like of loading an OS from the HD 303 onto the RAM 302 and starting the operation of the OS. The OS, a control program, and related data are respectively mapped on fields 402, 403, and 404, and a work area used by the CPU 301 to execute the program of the present invention is assured on a field 405.

FIG. 4B shows the data contents stored in the medium 308. Reference numeral 406 denotes volume information indicating information of data; 407, directory information; 408, a main program; and 409, its related data. The program 408 is converted into a program code on the basis of the flowcharts of the processing program shown in FIGS. 13 and 14.

FIG. 5 illustrates the software configuration of the printing site 103. Referring to FIG. 5, a workflow manager 501 is a software program which runs on the workflow management server 203. The workflow manager 501 periodically collects order information stored in the DB server 202, determines a workflow required to carry out respective processes corresponding to that order on the basis of the order information, and controls/manages the workflow. Furthermore, the workflow manager 501 issues a process execution instruction to processors (i.e., processing software) 502 which process steps required to implement an order process.

The processors 502 are software programs which run on the processors 204 and printer 205 in the printing site 103, and perform processes required to execute steps assigned to the processors 204 and the like.

The workflow manager 501 and processors 502 make inter-process communications via an I/F so as to exchange data associated with process execution. Note that inter-process communications may be implemented by the workflow manager and processors which run on an identical information processing apparatus as APIs (Application Program Interfaces) or by remote communications such as RPC (Remote Procedure Call) or SOAP (Simple Object Access Protocol).

FIG. 6 shows the workflow for explaining the software configuration shown in FIG. 5 on the basis of a practical example. In FIG. 6, assume that, for example, a simple print output service which carries out a user's print request by applying a booklet imposition process to entered document data, printing the processed document data, and delivering printouts to the user is executed.

Note that the processors 502 which process respective steps include a standardization step 601 of converting user's document data of an arbitrary format into a common standard format (e.g., a PDF format, bitmap data format, or iwd format (to be described later) is preferable) that can be processed by the respective processors which process the subsequent steps, a booklet imposition step 602 of applying a booklet imposition process to the data standardized in the standardization step 601, a print step 603 of acquiring printouts by performing a two-sided color print process of the data that has undergone the booklet imposition process in the booklet imposition step 602, and a delivery step 604 of performing a delivery process of the print data output in the print step 603 to the client user.

FIG. 7 is a block diagram showing details of the workflow manager 501. The workflow manager 501 includes a workflow control unit 701 which systematically controls components 702 to 707 which form the workflow manager 501, a configuration setting unit 702 which receives operation settings of the workflow manager 501 from the administrator of the workflow manager 501 via a predetermined graphical user interface or the like, an order information management unit 703 which manages order information acquired from the DB server 202, a JT (job ticket) management unit 704 which determines a workflow required to carry out processes corresponding to an order from the user on the basis of order information, and generates and manages workflow sequence information, an encryption management unit 705 which encrypts/decrypts the workflow sequence information and document data on the basis of the contents of a security setting received by the configuration setting unit 702, a resource management unit 706 which manages resources that move among steps, and a communication unit 707 which communicates with the respective processors 502 and the document entry site. An internal storage 708 stores order information 709 which is saved by the order information management unit 703, workflow sequence information 710 generated and saved by the JT management unit 704, an encryption key table 711 managed by the encryption management unit 705, a configuration setting table 712 which stores setting information received by the configuration setting unit 702, a reference resource 713 which stores external resources of document data and the like, a resource log 714 which manages a log of resources that move among steps, and the like.

Figure 8:
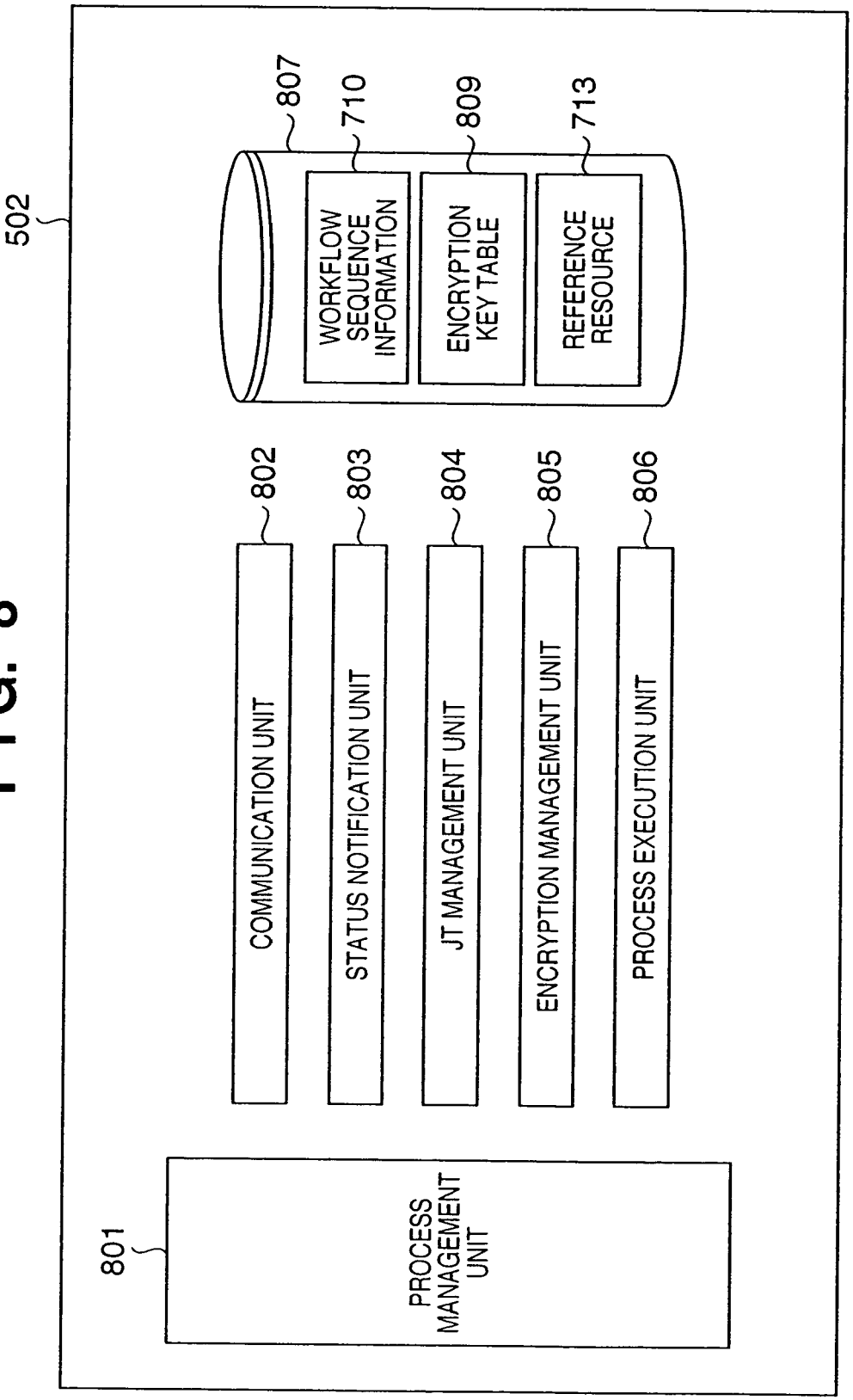
FIG. 8 is a block diagram showing the detailed configuration of a processor 502 according to the embodiment of the present invention.

FIG. 8 is a block diagram showing details of each processor 502. Referring to FIG. 8, the processor 502 includes a process control unit (or management unit) 801 which systematically controls components 802 to 806 that form the processor 502, a communication unit 802 which performs a communication process with the workflow manager 501, a status notification unit 803 which notifies the workflow manager 501 of the progress of the work of the processor 502 as status, a JT management unit 804 which manages the workflow sequence information 710 received from the workflow manager 501, an encryption management unit 805 which processes encryption information described in the workflow sequence information 710, a process execution unit 806 which executes an actual work process such as a booklet imposition process or the like, and the like. An internal storage 807 stores the workflow sequence information managed by the JT management unit 804, an encryption key table 809 managed by the encryption management unit 805, and the reference resource 713 which stores data required to execute a process transmitted from the workflow manager 501.

FIG. 9 shows an example of the configuration of the order information 709. As shown in FIG. 9, the order information includes order general information 901, document information 902, a print style 903, and the like.

The order general information 901 includes, e.g., the type of a print service, delivery destination information of printouts, and an order ID as identification information given to manage an order. The document information 902 stores the number of pages of document data and a URI (Uniform Resource Identifier) used to identify the document data. The print style 903 includes a finished paper size, an orientation of output sheets, a print method (e.g., one-sided printing, two-sided printing, or the like), a color mode that specifies color printing or monochrome printing, and the like. Note that the print style can include other kinds of information such as a paper type, staple information, and the like in addition to the above information, but a description of such information will be omitted for the sake of simplicity.

Figure 10B:
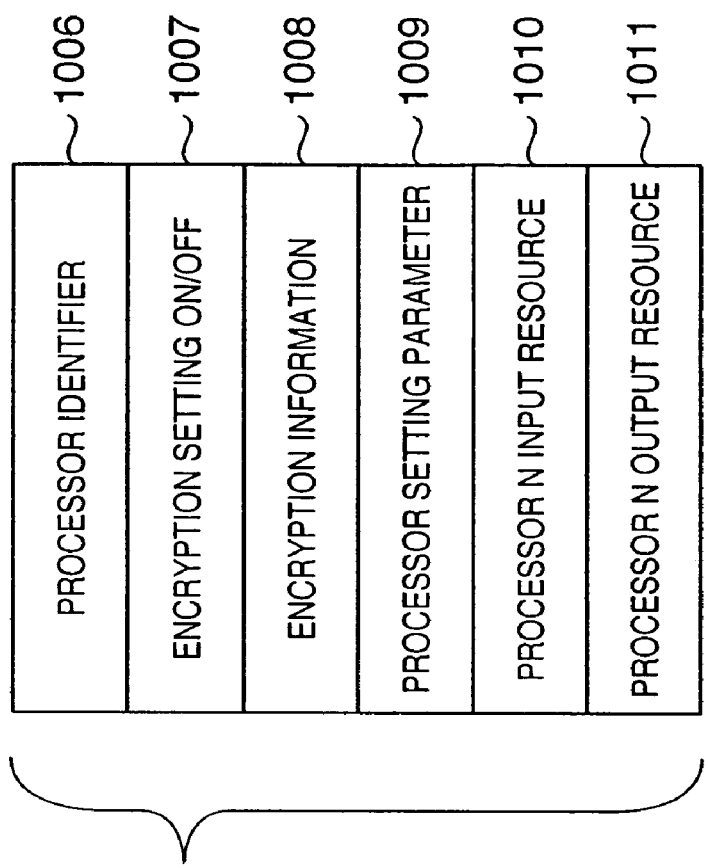
Figure 10A:
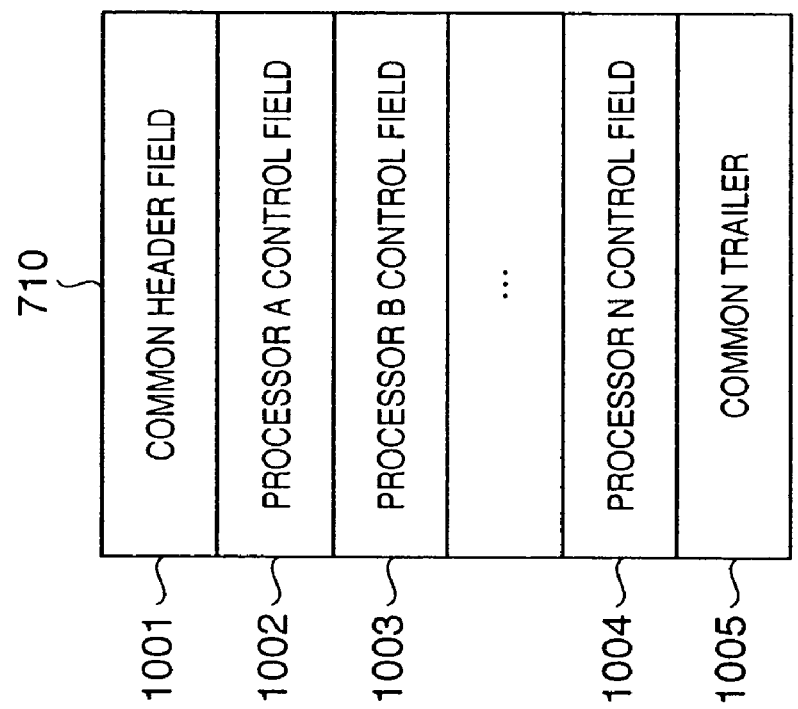

FIGS. 10A to 10C show an example of the configuration of the workflow sequence information 710 of the present invention. FIG. 10A shows the overall configuration of the workflow sequence information 710. In FIG. 10A, reference numeral 1001 denotes a common header field which stores common information among the respective processors 502 which form a workflow and, for example, a job ID as identification information used to uniquely identify the workflow. Reference numerals 1002, 1003, and 1004 denote control fields which describe setting information used to control the processors 502 that form the workflow. For example, the control fields 1002, 1003, and 1004 respectively describe control settings of processors A, B, and N. Reference numeral 1005 denotes a common trailer which indicates the end of the workflow sequence information.

FIG. 10B shows details of the processor control fields 1002 to 1004. Reference numeral 1006 denotes a processor identifier used to uniquely identify the processor. As this processor identifier, integers from 0 to N are assigned in correspondence with an order of processes to be executed in this embodiment for the sake of simplicity. However, the processor identifier in the present invention is not limited to such specific mode.

Reference numeral 1007 denotes a flag used to determine if an encryption setting for each processor is made. If the flag is "ON (or "1")", an encryption setting is made; if the flag is "OFF (or "0")", no encryption setting is made.

Reference numeral 1008 denotes a field that describes details of a cryptosystem like "public key cryptosystem A" (including key information and the like); 1009, a processor control parameter that specifies the operation of the processor 502; 1010, an input resource to the processor; and 1011, an output resource from the processor.

The input resource 1010 to the processor 502 corresponds to data to be processed by the processor 502 of interest. For example, when the processor 502 of interest corresponds to the standardization step of converting entered document data into standardized data that can be processed by the respective processors 502, the input resource is described using a URI (Uniform Resource Identifier) that uniquely identifies the document data. The output resource is data as the processing result of the processor 502 of interest and, for example, stores a URI that uniquely identifies the standardized data after the standardization process. Note that the data entity itself may be stored as the input and output resource fields in place of the URIs indicating the data.

In this configuration, for example, when the workflow includes four processors, i.e., processors A, B, C, and D, the workflow sequence information at this time is described, as shown in FIG. 10C.

Referring to FIG. 10C, the workflow sequence information 710 stores information of a job ID and work log in the common header field 1001. Subsequently, the information 710 stores information of processor control fields corresponding to respective processors A to D, and finally stores the common trailer indicating the end of information.

FIG. 11A shows an example of the encryption key table 711 on the workflow management server 203. A column 1101 stores processor identifiers required to identify the respective processors 502 which form the workflow. This processor identifier 1101 is information corresponding to the processor identifier 1006 in FIG. 10B. A column 1102 stores a private key (that of the workflow management server 203) which is given to the processor 502 identified by the processor identifier 1101 and corresponds to a public key (that of the workflow management server 203). A column 1103 stores a public key (that of the processor 502) paired with the private key (that of the processor 502) of the processor 502 identified by the processor identifier 1101.

FIG. 11B shows an example of the encryption key table 809 on each processor 502. A column 1104 stores a public key (that of the workflow management server 203) paired with the private key 1102 on the workflow management server 203 side. A column 1105 stores a private key of the processor which is paired with the public key 1103 of the processor held by the workflow management server 203. That is, the private key 1102 and public key 1104 form one key pair, and the public key 1103 and private key 1105 form another key pair.

Note that this embodiment will exemplify a general public key cryptosystem using a pair of private and public keys as a key pair. This system utilizes the property that data encrypted by one key of the pair can be decrypted by only the other key. As the cryptosystem, a common key cryptosystem, a combination (hybrid cryptosystem) of the common and public key cryptosystems, or other systems may be used as long as such cryptosystem is unique to each processor.

Also, a description of a key distribution method of the workflow management server 203 and processors 204 will be omitted. For example, a general key exchange algorithm may be adopted using the I/F 503 or keys may be physically distributed via the medium 308 to form key tables.

FIG. 12A shows an example of the configuration setting 712 that holds operation setting values received via the configuration setting unit 702 on the workflow management server 203. Normally, this setting is received from the operator of the workflow management server 203 via a graphical user interface (GUI). A column 1201 stores a setting item of the workflow management server 203, and a column 1202 holds a setting value corresponding to the setting item 1201. Subsequently, the workflow performs operations in accordance with the contents of the setting values 1202. FIG. 12B shows an example of a configuration setting table corresponding to a practical example in this embodiment. In this table, the configuration setting includes a secure mode 1203 that encrypts the workflow sequence information and reference data, and a deletion certificate function 1204 of user residual data, as will be described below.

The secure mode 1203 executes an encryption process using the private and public keys of each processor so as to allow that processor to decrypt and process only information to be referred to in the self process of the workflow sequence information 710.

More specifically, the contents of a field unique to each processor 502 in the workflow sequence information 710 are encrypted using the public key unique to that processor 502. The processor 502 decrypts the information required for a process of itself using the private key used in encryption. Furthermore, the processor encrypts the output result of itself as the input to the next processor 502 using the public key of the workflow management server 203, and returns it to the workflow management server 203. The workflow management server 203 decrypts the output from that processor 502 using the corresponding private key, then encrypts the decrypted output using the public key for the next processor 502, and passes the process to the next processor. This operation is repeated until the last processor.

Next, the deletion certificate function 1204 is a function of deleting the reference resource 713, which is processed by each processor 502, after completion of the process of that processor 502, and granting a complete deletion certificate to the user when deletion processes have been done by all the processors 502.

Figure 13B:
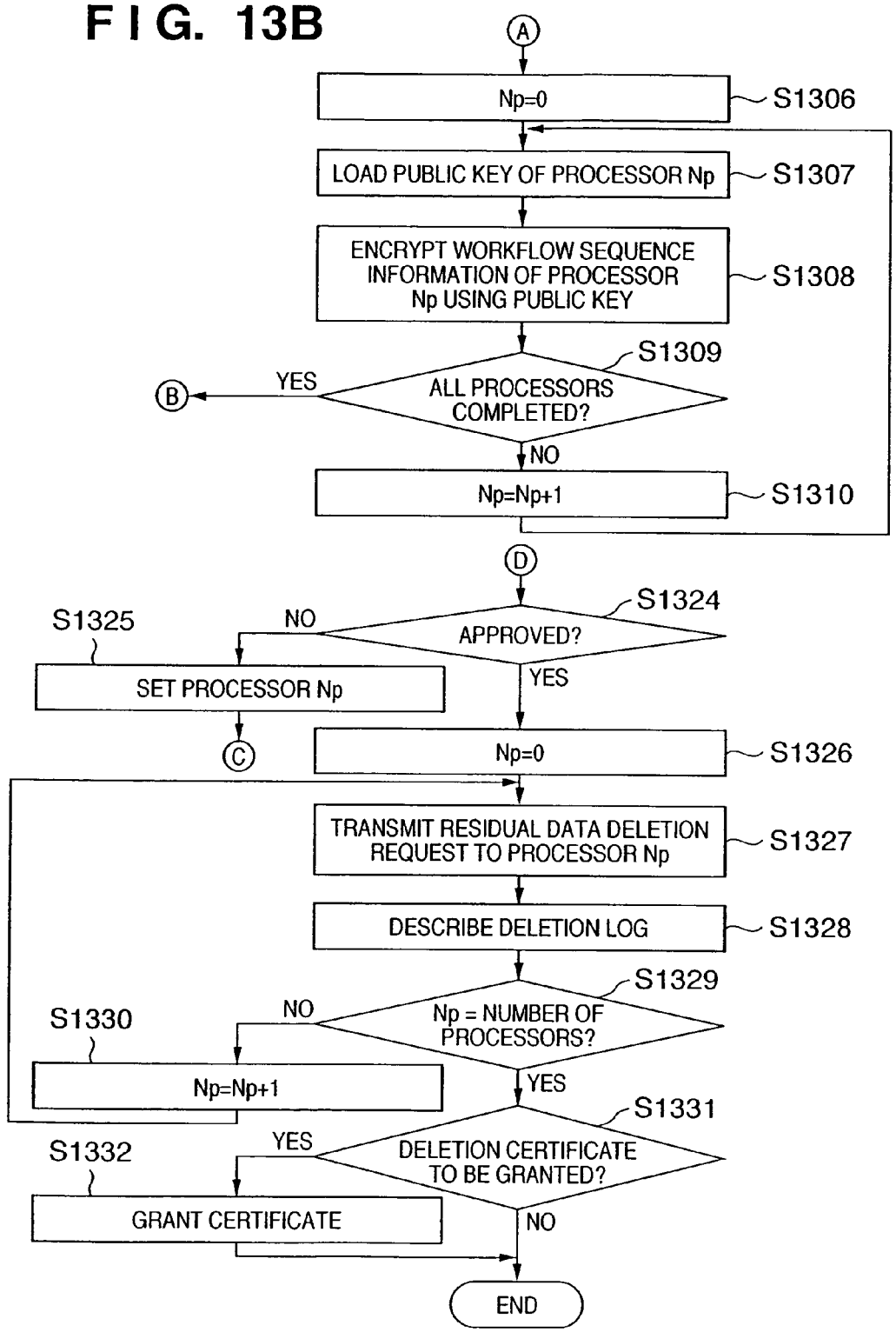

The processing of the workflow manager 501 upon reception of document data will be described in more detail below. FIGS. 13A and 13B are flowcharts showing an example of the processing of the workflow manager 501.

If the workflow manager 501 receives the order information 709 and document data from the DB server 203 via the communication unit 707 (S1301), the order information management unit 703 stores the received order information 709 in the internal storage 708 (S1302). Furthermore, the order information management unit 703 receives the document data of the user, and stores it as the reference resource 713 in the internal resource 708 (S1303).

Next, the JT management unit 704 generates a workflow required to realize processes corresponding to the order contents with reference to the contents of the order information 709 and the reference resource 713, and stores it in the internal storage 708 as the workflow sequence information 710 (S1304).

The workflow control unit 701 acquires, from the internal storage 708, the current configuration setting information 712 of the workflow manager 501, which is received in advance via the configuration setting unit 702, and checks on the basis of the setting contents of the secure mode 1203 if the secure mode is set for this workflow (S1305).

If the setting value 1202 of the secure mode 1203 is ON, the flow advances to step S1306; otherwise, the flow advances to step S1311. In step S1306, a parameter Np indicating the processor identifier required to apply a process to each processor 502 described in the workflow sequence information 710 is initialized to zero.

In step S1307, the encryption management unit 705 loads the public key 1103 of the processor 502 whose processor ID 1101 matches the value of the parameter Np in the encryption key table shown in FIG. 11A. In step S1308, the encryption management unit 705 encrypts the processor setting parameter 1009, processor input resource 1010, and processor output resource 1011 in the processor control field of the workflow sequence information 710 using the public key 1103 loaded in step S1307 (S1308).

The processes in steps S1307 and S1308 are repeated in correspondence with the number of processors included in the workflow sequence information 710. It is checked in step S1309 if the encryption process for all the processors 502 to be processed is complete. If the encryption process is complete, the flow advances to step S1311. On the other hand, if processor control fields to be encrypted still remain, the parameter Np is incremented in step S1310, and the flow returns to step S1307 to continue the processes. In this way, since the control loops in correspondence with the number of processors 502 included in the workflow, the contents of the field unique to each individual processor are encrypted by the public key 1103 of that processor 502.

In step S1311, the parameter Np used to identify the processor is initialized to zero again. In step S1312, the workflow manager 501 transmits the input resource required to implement the processing step assigned to that processor 502 to the processor 502 whose processor identifier 1006 matches Np. In step S1313, the resource management unit 706 of the workflow manager 501 stores a log indicating transmission of the input resource in the internal storage 708 as the resource log 714. In step S1314, the workflow manager 501 transmits the workflow sequence information 710 to the processor 502 of interest.

Note that the input resource to be transmitted in step S1312 is, for example, document data. In this embodiment, the input resource is independently transmitted. Alternatively, the input resource 1011 of the processor 502 may directly describe data, and may be output simultaneously with transmission step S1314 of the workflow sequence information 710. Also, the input resource may describe a URI, and may indirectly make the processor refer to the saved input resource.

In step S1315, a process execution command is transmitted to the processor 502 to which the input resource is transmitted. Note that "execution of process" means execution of a process assigned to the processor 502 of interest upon reception of the document data as the aforementioned input resource and, for example, it means execution of a process such as a standardization process that outputs standardized data, a booklet imposition process that performs booklet imposition by receiving the standardized data as the input resource, or the like.

Upon completion of a predetermined process in the corresponding processor 502 in accordance with the execution command from the workflow manager 501, the workflow manager 501 is notified of process completion by that processor 502 (i.e., receives a notification indicating that the respective processing device has completed processing) and receives the output resource such as the standardized data, data that has undergone booklet imposition, or the like (S1316).

It is then checked in step S1317 on the basis of the setting contents of the secure mode 1203 in the configuration setting information 712 if the secure mode is set for the workflow. As a result, if the secure mode is set, the flow advances to step S1318, and decryption is made using the private key 1102 of the workflow server 203. Note that the processing result of each processor is encrypted in that processor using the public key of the workflow management server 203. On the other hand, if no secure mode is set, the flow advances to step S1319.

It is checked in step S1319 if the processes of all the processors 502 included in the workflow sequence information 710 are complete (i.e., it is determined whether the print processing has been completed). If the processors whose processes are not complete yet still remain, the parameter Np is incremented in step S1320, and the control advances to the process of the next processor 502.

At this time, if the secure mode is set, the flow advances to step S1322. If the output resource of the processor 502 (the processor identifier matches Np) becomes the input resource of the next processor 502 (the processor identifier matches Np+1), that output resource is encrypted by the public key of the processor 502 (Np+1).

In step S1323, the workflow sequence information 710 is updated, and the flow returns to step S1312 again to continue the process for each processor.

On the other hand, if it is determined in step S1319 that all the processes are complete, an approval process is executed in step S1324 (i.e., it is determined whether the client has acknowledged the completion of the print processing). Normally, this approval process is settled by user's on-line approval using e-mail or the like, or getting user's approval via a phone communication or the like by physically delivering printed data. If it is determined in step S1324 that no approval is obtained, the processor 502 which is not approved is designated in step S1325, and the process for each processor is repeated.

If it is determined in step S1324 that approval is obtained (i.e., that the client has acknowledged the completion of the print processing), the parameter Np corresponding to the processor identifier is initialized to zero again in step S1326. In step S1327, a residual data deletion (post-process) request is issued to the processor 502 whose processor identifier 1006 matches Np (i.e., a deletion instruction is transmitted to delete information regarding the process data). Upon completion of deletion of residual data of one processor 502, the resource management unit 706 describes that result in the resource log 714 (S1328). It is checked in step S1329 if the residual data deletion processes of all the processors 502 are complete (i.e., it is determined whether all of the plurality of processing devices have deleted the information regarding the processing data in accordance with the deletion instruction). If the processors 502 to be processed still remain (i.e., if at least one of the processing devices has not deleted the information regarding the processing data), the flow advances to step S1330 to increment Np, and the flow then returns to step S1327 to continue the process (i.e., to transmit the deletion instruction to the device(s) which has not deleted the information regarding the processing data).

Upon completion of the processes of all the processors, the flow advances to step S1331. In step S1331, the configuration setting information 710 is acquired from the internal storage 708, and it is checked based on the setting value of the deletion certificate function 1204 if the deletion certificate function is set for the workflow. If the setting value 1202 is "ON", as shown in FIG. 12B, the flow advances to step S1332, and deletion certificate information is generated.

FIG. 15 shows an example of the deletion certificate information. Note that the deletion certificate information is data which certifies that residual data as the reference resource 713 stored in the internal storage 807 is deleted in each processor 502 on the basis of the log described in the resource log 714 by the resource management unit 707. This deletion certificate information may be sent to the user via e-mail, or may be transmitted to the Web server 201 so as to allow the user to access it using the Web browser from the client 101.

Figure 14:
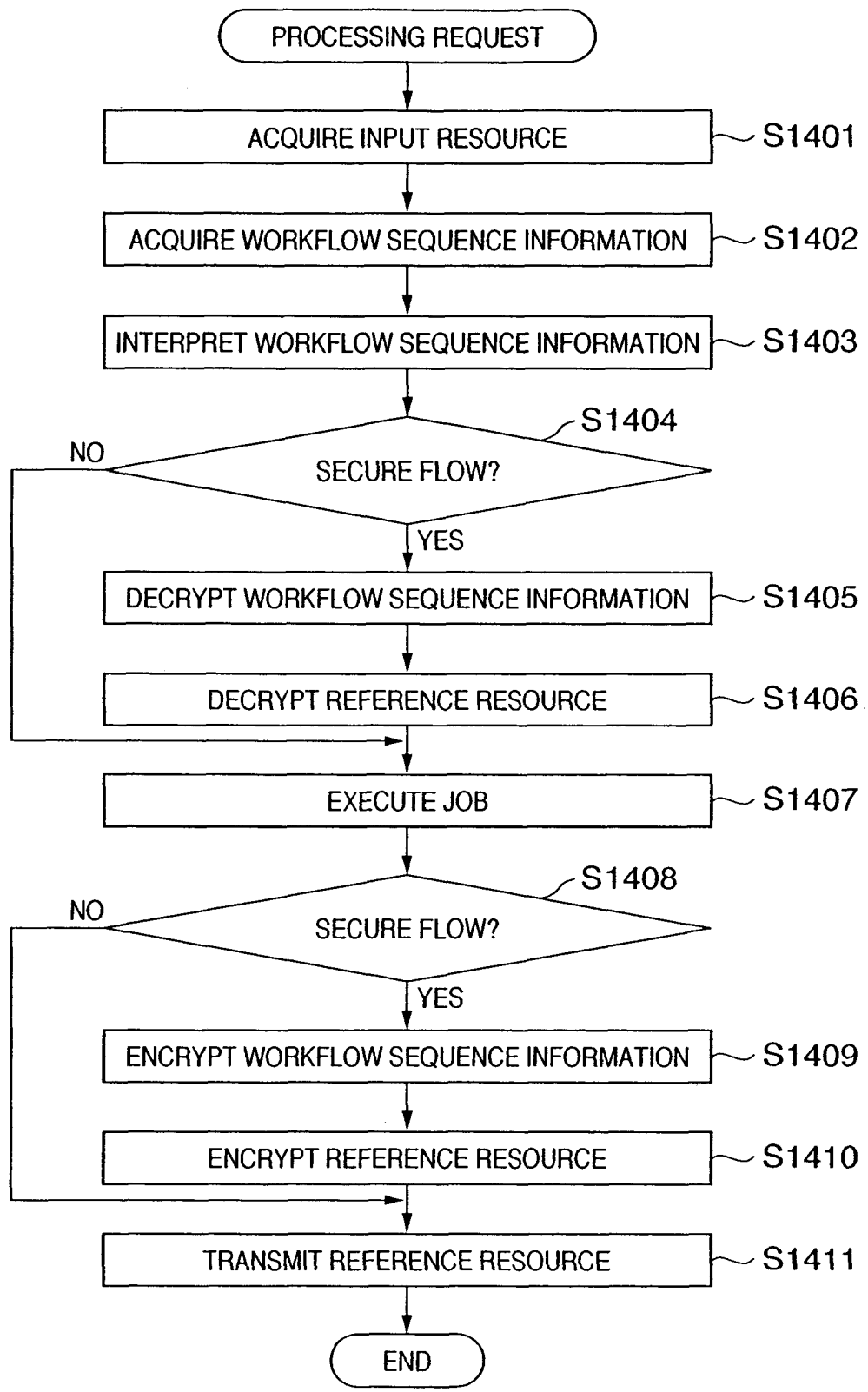
FIG. 14 is a flowchart showing an example of the processing of the processor 502 according to the embodiment of the present invention.

The processing on the processor 502 side, which is executed in correspondence with the aforementioned processing of the workflow manager 501, will be described below with reference to FIG. 14. FIG. 14 is a flowchart showing the processing of each processor 502 in steps S1312 to S1316 in FIG. 13.

In step S1401, the processor 502 which has the processor identifier 1006 that matches the parameter Np receives the input resources required to implement a process assigned to it from the workflow manager 501 via the communication unit 802, and stores the received input resource in the internal storage 807 as the reference resource 713.

In step S1402, the processor 502 acquires the workflow sequence information 710, and the JT management unit 804 stores it in the internal storage 807. Note that reception of the input resource and that of the workflow sequence information 710 are separately described, but the entity itself of the input resource may be directly included in the workflow sequence information.

The JT management unit 804 interprets the workflow sequence information 710 in step S1403. At this time, the JT management unit 804 reads the processor control field of itself of the corresponding processor identifier 1006 in the workflow sequence information 710, and checks in step S1404 if the encryption setting flag 1007 is "ON". If the encryption setting flag 1007 is "ON", the flow advances to step S1405 to decrypt the workflow sequence information 710 using the private key 1105 of the processor 502 with reference to the key management table 809. Also, the reference resource 713 is decrypted using the private key 1105 of the processor 502.

In step S1407, the process to be executed by the processor 502 is executed on the basis of the decrypted information. The field 1011 of the workflow sequence information 710 of the output resource obtained as a result of execution of the process is encrypted using the public key 1104 of the workflow management server 203 stored in the key management table 809 (S1409). Also, the reference resource 713 as the output resource is similarly encrypted (S1410), and the output resource is transmitted to the workflow manager 501 (S1411).

As described above, according to the present invention corresponding to this embodiment, information unique to each processor 502 in the workflow sequence information 710 is encrypted using an encryption key unique to that processor 502, so that the work of a given processor 502 can no longer be referred to from other processors 502. That is, secure data exchange can be implemented among processors.

Furthermore, a "deletion process" is defined as a workflow process to completely delete data, and a data deletion log can be disclosed to the user as a deletion certificate. In this way, a secure workflow system that can earn user's confidence can be built.

Second Embodiment

In the first embodiment, a general description of the present invention has been given. In this embodiment, the present invention will be described in more detail by way of its practical example. In the following description, assume that the user places a print order that includes 4-page booklet imposition and two-sided printing processes of document data (entry.txt) via the client 101.

When the order contents input from the client 101 by operating the Web browser or the like are fixed, the WEB server 201 generates order information and stores it in the DB server 202.

FIG. 16 shows an example of the order information generated in this case. Referring to FIG. 16, order general information 1601 is set with "output service" as the type of service, "Taro Yamada/12-34 ΔΔ, OO city" as the delivery destination information, and "ID1234567" as the order ID. Furthermore, as information associated with document data, "8" as the number of pages and "entry.txt" as the document data name are input. As a print style 1603, "A4" as the finished size, "two-sided printing" as the printing method, and "color" as the color mode are set. Note that this embodiment is specialized to such settings, but other settings may be included.

When document data is uploaded from the client 101 to the WEB server 201, the document data is stored in the DB server 202. Upon completion of the storage process, an order reception message from the WEB server 201 reaches the workflow management server 203 in the printing site 103. Upon reception of this message, the workflow management server 203 acquires the order information from the DB server 202. If the document data has been uploaded, the workflow management server 203 similarly acquires the document data from the DB server 202.

At this time, assume that the workflow management server 203 is set in advance, as shown in FIG. 12B, via the configuration setting unit 702. That is, assume that the secure mode 1203 that applies the encryption process unique to a processor to the workflow sequence information and input/output resources is "ON", and the deletion certificate function 1204 that grants a deletion certificate to the user is "ON". Also, the encryption key table 711 of the workflow management server 203 is initialized as key information used in the respective processors 502, as shown in FIG. 11C.

Furthermore, a description will be given with reference to the flowchart of FIG. 13. The order information management unit 703 stores the order information acquired from the DB server 202 via the communication unit 707 in the internal storage 708 as the order information 709 in step S1301. In step S1303, the order information management unit 703 stores "entry.txt" as the document data uploaded by the user in the internal storage 708 as the reference resource 713.

In step S1304, the JT management unit 704 generates workflow sequence information 710 by defining a workflow required to implement print processes corresponding to the actual order contents with reference to the order information 709 and reference resource 713 stored in the internal storage 708, and stores the workflow sequence information 710 in the internal storage 708.

FIG. 17A shows an example of the workflow sequence information 710 generated and stored in step S1304.

Referring to FIG. 17A, a field 1701 indicates the job ID assigned to the order information. A field 1702 is set with the processor identifier of the processor 502 that executes the standardization step (to be referred to as a standardization processor hereinafter). A field 1703 is set with OFF indicating no encryption at this stage. A field 1704 is to store encryption information, but it is set with "NULL" indicating no setting value at this time.

A field 1705 is to store the setting value of the standardization processor, but it is set with "NULL" indicating no setting value in this embodiment. A field 1706 is set with "entry.txt" as the input resource of the standardization processor. A field 1707 is set with "standardized_data.iwd" as the output resource of the standardization processor.

This "*.iwd" file is the standard format of a file used in this embodiment, includes at least document data, and can describe the work contents for the document data as a job ticket. Note that the document data has, e.g., a PDF format, the job ticket can be a text file, and the "*.iwd" file corresponds to an archive file of this document data and job ticket.

Note that the relationship between the input resource 1706 and output resource 1707 indicates that the standardization processor receives "entry.txt" as the input and outputs "standardized_data.iwd". The input resource 1706 and output resource 1707 may describe the storage destinations of the files or may be embedded with data of the corresponding files themselves.

Likewise, a field 1708 is set with the processor identifier of the processor 502 that executes the booklet imposition step (to be referred to as a booklet imposition processor hereinafter). A field 1709 describes "no encryption" at this time. Also, a field 1710 is set with "NULL". A field 1711 is set with "4 pages" as the setting parameter of the booklet imposition processor. A field 1712 is set with "standardized_data.iwd" as the input resource of the booklet imposition processor.

A field 1713 is set with "imposed_data.iwd" as the output resource of the booklet imposition processor. Note that the relationship between the input resource 1712 and output resource 1713 indicates that the booklet imposition processor receives "standardized_data.iwd" and outputs "imposed_data.iwd". Note that the input resource 1712 and output resource 1713 may describe the storage destinations of the files or may be embedded with data of the corresponding files themselves.

Also, a field 1714 is set with the processor identifier of the processor 502 that executes the print step (to be referred to as a print processor hereinafter). This print processor corresponds to the printer 205. A field 1715 is set with "no encryption" at this time. Also, a field 1716 is set with "NULL". A field 1717 is set with "color/two-sided" as the setting parameters of the print processor. A field 1718 is set with "imposed_data.iwd" as the input resource of the print processor.

A field 1719 is set with "printer A: tray 1" indicating an exhaust tray of a physical printer as the output resource of the print processor. The relationship between the input resource 1718 and output resource 1719 indicates that the print processor receives "imposed_data.iwd" as the input, and outputs the output result onto "printer A: tray 1". The input resource 1718 may describe the storage destination of the file or may be embedded with data of the corresponding file itself.

Likewise, a field 1720 is set with the processor identifier of the processor 502 that executes the delivery step (to be referred to as a delivery processor hereinafter). A field 1721 is set with "no encryption" at this time. Also, a field 1722 is set with "NULL". A field 1723 is set with "NULL" as the setting parameters of the delivery processor. A field 1724 is set with "printer A: tray 1" as the input resource of the delivery processor.

A field 1725 is set with "name: Taro Yamada, delivery address: 12-34 ΔΔ, OO city" indicating the name and address of the delivery destination as the output resource of the print processor. Note that the relationship between the input resource 1723 and output resource 1724 indicates that the delivery processor receives the data on "printer A: tray 1" as the input, and delivers that data to "name: Taro Yamada, delivery address: 12-34 ΔΔ, OO city".

In step S1305, the configuration setting information 712 of the workflow processor 501 is acquired from the internal storage 708, and it is checked based on the setting contents of the secure mode 1203 if the secure mode is set. If the secure mode is set "ON" in the configuration setting information 712, as shown in FIG. 12B, the flow advances to step S1306.

In step S1306, the parameter Np indicating the ID of the processor that executes an internal process is initialized with respect to the processors 502 described in the workflow sequence information 710 shown in FIG. 17A. Note that the parameter Np is given with "0" as the identifier indicating the standardization processor.

In step S1307, "public key 0" for the standardization processor whose processor identifier matches "0" is loaded from the encryption key table shown in FIG. 11C, and the control field of the standardization processor in the workflow sequence information 710 is encrypted using public key 0 (S1308). This process is executed for respective processors, i.e., the booklet imposition processor (Np=1), print processor (Np=2), and delivery processor (Np=3). Public keys 1, 2, and 3 are used as those for the respective processors 502. The encrypted workflow sequence information 710 is as shown in FIG. 17B.

Note that a field 1729 indicates data encrypted using public key 0 for the standardization processor; 1730, data encrypted using public key 1 for the booklet imposition processor; 1731, data encrypted using public key 2 for the print processor; and 1732, data encrypted using public key 3 for the delivery processor.

It is then checked in step S1309 if the processes are repeated as many as the number of processors included in the workflow sequence information 710. If the processes for all the processors are complete, the flow advances to step S1311 to initialize the parameter Np corresponding to the processor identifier 1006 to "0". Next, in step S1312 the input resource (entry.txt) is transmitted to the standardization processor with the processor identifier=0. In step S1313, a log indicating transmission of the input resource is recorded in the resource log 714.

In step S1314, the workflow sequence information 710 is transmitted to the standardization processor. In step S1315, a process execution command is transmitted to the standardization processor. Note that execution of the process indicates that of the standardization processor which receives document data as the input resource, and outputs standardized data, as described above.

Upon reception of the output resource as the standardized data from the standardization processor in step S1316, since the secure flow setting is designated, the flow advances to step S1318, and the output resource described in the workflow sequence information 710 is decrypted using private key 0 (1102) of the workflow management server 203, which is paired with public key 0 (1104) of the workflow management server 203 (S1318). Furthermore, in step S1322 the input resource of the booklet imposition processor as the next processor is encrypted using public key 1 (1103) of the booklet imposition processor, thus updating the workflow sequence information 710 (S1323).

Next, the input resource (standardized_data.iwd) is transmitted to the booklet imposition processor (S1312). In step S1313, a log indicating transmission of the input resource is recorded in the resource log 714. In step S1314, the workflow sequence information 710 is transmitted to the booklet imposition processor. In step S1315, a process execution command is transmitted to the booklet imposition processor. Note that execution of the processor indicates that of the booklet imposition process which receives standardized_data.iwd as the input resource, and outputs imposed data, as described above.

Upon reception of the output resource as the imposed data from the booklet imposition processor in step S1316, since the secure flow setting is designated, the flow advances to step S1318, and the output resource described in the workflow sequence information 710 is decrypted using private key 1 (1102) of the workflow management server 203, which is paired with the public key 1104 of the workflow management server 203 (S1318). Furthermore, in step S1322 the input resource of the print processor as the next processor is encrypted using public key 2 (1103) of the print processor, thus updating the workflow sequence information 710 (S1323).

The input resource (imposed_data.iwd) is transmitted to the print processor (S1312). In step S1313, a log indicating transmission of the input resource is recorded. In step S1314, the workflow sequence information 710 is transmitted to the print processor. In step S1315, a process execution command is transmitted to the booklet imposition processor. Note that execution of the process indicates that of the print processor which receives imposed_data.iwd as the input resource, and outputs printed data onto "printer A: tray 1", as described above.

In step S1316, the resource indicating the output destination of the print processor is received from the print processor, and the secure flow setting is designated, the flow advances to step S1318. In step S1318, the output resource described in the workflow sequence information 710 is decrypted using private key 2 (1102) of the workflow management server 203, which is paired with public key 2 (1104) of the workflow management server 203. Furthermore, in step S1322 the input resource of the delivery processor as the next processor is encrypted using public key 3 (1103) of the delivery processor, thus updating the workflow sequence information 710 (S1323).

Finally, the delivery processor executes an actual delivery process in step S1316. If it is determined in step S1312 that all the processes are complete, the approval process is executed in step S1324. Normally, this approval process is settled by user's on-line approval, or user's approval via a phone communication or the like by physically delivering printed data. If it is determined in step S1324 that no approval is obtained, the processor 502 which is not approved is designated in step S1325, and the process for each processor is repeated.

If it is determined in step S1324 that approval is obtained, the parameter Np corresponding to the processor identifier is initialized to zero again in step S1326. A residual data deletion (post-process) request is issued to the processor whose processor identifier matches Np. At this time, a deletion log is described in the resource log 714 in step S1328. This process is repeated for all the processors. Since a setting of granting a deletion certificate is determined in step S1331, a deletion certificate is granted.

FIG. 15 shows an example of the deletion certificate. As shown in FIG. 15, this data is a certificate indicating that residual data indicating the logs themselves of the resources described in the resource log 714 by the resource management unit 707 are deleted. This certificate may be delivered to the user or may be sent to the Web server to be presented on the Web browser of the user.

As described above, according to the present invention corresponding to this embodiment, the workflow sequence information 710 is generated in accordance with the request contents from the user, and information unique to each processor in the workflow sequence information 710 is encrypted using an encryption key unique to that processor. Hence, the work of a given processor can no longer be referred to from other processors. That is, secure data exchange can be implemented among processors.

According to the present invention, the security of information required in a given work step against other work steps can be protected.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM, DVD-R or DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent application No. 2004-252904 filed on Aug. 31, 2004, which is hereby incorporated by reference herein.

What is claimed is:

1. An information processing apparatus which transmits processing data regarding print processing to a plurality of processing devices, in order to perform the print processing according to a print order received from a client, said apparatus comprising:
a central processing unit that executes a workflow manager program for controlling said apparatus to:
receive, from the plurality of processing devices, notifications indicating that the respective processing devices have completed processing based on the processing data;
determine whether the print processing has been completed, based on the notifications received from the plurality of processing devices;
determine whether the client has acknowledged the completion of the print processing, when it is determined that the print processing has been completed;
transmit to the plurality of processing devices a deletion instruction to delete information regarding the processing data, when it is determined that the client has acknowledged the completion of the print processing; and
determine whether all of the plurality of processing devices have deleted the information regarding the processing data in accordance with the deletion instruction,
wherein when it is determined that at least one of the plurality of processing devices has not deleted the information regarding the processing data, the deletion instruction is transmitted to the device which has not deleted the information regarding the processing data.

2. The information processing apparatus according to claim 1, wherein when it is determined that the client has not acknowledged the completion of the print processing, an instruction is transmitted to the processing device corresponding to the processing for which completion has not been acknowledged by the client, which causes the corresponding processing device to execute the processing based on the transmitted processing data.

3. A control method of an information processing apparatus which transmits processing data regarding print processing to a plurality of processing devices, in order to perform the print processing according to a print order received from a client, said method comprising the steps of:
receiving, from the plurality of processing devices, notifications indicating that the respective processing devices have completed processing based on the processing data;
determining whether the print processing has been completed, based on the notifications received from the plurality of processing devices;
determining whether the client has acknowledged the completion of the print processing, when it is determined that the print processing has been completed;
transmitting to the plurality of processing devices a deletion instruction to delete information regarding the processing data, when it is determined that the client has acknowledged the completion of the print processing; and
determining whether all of the plurality of processing devices have deleted the information regarding the processing data in accordance with the deletion instruction,
wherein when it is determined that at least one of the plurality of processing devices has not deleted the information regarding the processing data, the deletion instruction is transmitted to the device which has not deleted the information regarding the processing data, and
wherein the preceding steps are performed by a central processing unit of the information processing apparatus.

4. The method according to claim 3, wherein when it is determined that the client has not acknowledged the completion of the print processing, an instruction is transmitted to the processing device corresponding to the processing for which completion has not been acknowledged by the client, which causes the corresponding processing device to execute the processing based on the transmitted processing data.

5. A computer program stored in a non-transitory computer-readable medium which causes a computer to execute a control method of an information processing apparatus which transmits processing data regarding print processing to a plurality of processing devices to, in order perform the print processing according to a print order received from a client, said method comprising the steps of:
receiving, from the plurality of processing devices, notifications indicating that the respective processing devices have completed processing based on the processing data;
determining whether the print processing has been completed, based on the notifications received from the plurality of processing devices;
determining whether the client has acknowledged the completion of the print processing, when it is determined that the print processing has been completed;
transmitting to the plurality of processing devices a deletion instruction to delete information regarding the processing data, when it is determined that the client has acknowledged the completion of the print processing; and
determining whether all of the plurality of processing devices have deleted the information regarding the processing data in accordance with the deletion instruction,
wherein when it is determined that at least one of the plurality of processing devices has not deleted the information regarding the processing data, the deletion instruction is transmitted to the device which has not deleted the information regarding the processing data.

6. The information processing apparatus according to claim 1, wherein said information processing apparatus is a server.

7. The method according to claim 3, wherein the information processing apparatus is a server.

8. The computer program according to claim 5, wherein the information processing apparatus is a server.

* * * * *